(12) United States Patent
Lee et al.

(10) Patent No.: US 10,061,903 B2
(45) Date of Patent: Aug. 28, 2018

(54) DATA PROCESSING METHOD AND ELECTRONIC DEVICE THEREOF

(71) Applicant: Samsung Electronics Co., Ltd., Suwon-si, Gyeonggi-do (KR)

(72) Inventors: Ki-Huk Lee, Suwon-si (KR); Moon-Soo Kim, Seoul (KR); Hyun-Soo Kim, Yongin-si (KR); Jung-Eun Lee, Suwon-si (KR); Ho-Chul Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/643,301

(22) Filed: Mar. 10, 2015

(65) Prior Publication Data

US 2015/0254436 A1 Sep. 10, 2015

(30) Foreign Application Priority Data

Mar. 10, 2014 (KR) ........................ 10-2014-0027803

(51) Int. Cl.
*G06F 21/10* (2013.01)
*G06F 21/60* (2013.01)

(52) U.S. Cl.
CPC ............ *G06F 21/10* (2013.01); *G06F 21/606* (2013.01); *G06F 2221/0748* (2013.01)

(58) Field of Classification Search
CPC ................................ G06F 21/06; G06F 21/10

USPC .......................................................... 726/26
See application file for complete search history.

(56) References Cited

U.S. PATENT DOCUMENTS

| | | | | |
|---|---|---|---|---|
| 2010/0208975 | A1* | 8/2010 | Jones et al. ............... | G06K 7/12 382/137 |
| 2013/0212202 | A1* | 8/2013 | Lee ....................... | G06Q 10/107 709/206 |
| 2014/0106710 | A1* | 4/2014 | Rodriguez .......... | H04M 1/7253 455/411 |
| 2014/0215217 | A1* | 7/2014 | Gronowski ........... | H04L 9/0838 713/171 |
| 2014/0324986 | A1* | 10/2014 | Zhang .................... | H04L 51/36 709/206 |
| 2014/0359272 | A1* | 12/2014 | Hiltunen .................. | G09C 1/00 713/150 |

FOREIGN PATENT DOCUMENTS

KR 10-2008-0044598 A 5/2008

* cited by examiner

*Primary Examiner* — Eleni A Shiferaw
*Assistant Examiner* — Hee K Song
(74) *Attorney, Agent, or Firm* — Jefferson IP Law, LLP

(57) ABSTRACT

A method of operating an electronic device is provided. The method includes creating a security key based on data shared with a specific electronic device, creating security configuration information and a watermarking content based on the security key, and transmitting the security configuration information and the watermarking content to the specific electronic device.

20 Claims, 10 Drawing Sheets

DATA PROCESSING METHOD AND ELECTRONIC DEVICE THEREOF

CROSS-REFERENCE TO RELATED APPLICATION(S)

This application claims the benefit under 35 U.S.C. § 119(a) of a Korean patent application filed on Mar. 10, 2014 in the Korean Intellectual Property Office and assigned Serial number 10-2014-0027803, the entire disclosure of which is hereby incorporated by reference.

TECHNICAL FIELD

The present disclosure relates to a method of operating an electronic device having a content including security-processed information, and the electronic device thereof. More particularly, the present disclosure relates to a method of operating an electronic device in which at least one message can be included in a content by using a watermark scheme, and the at least one message inserted to the content can be displayed through a designated security key.

BACKGROUND

A watermark used for an information security is a technique for inserting a mark, which is known to only an owner, to an original content, such as a text, an image, a video, an audio, and the like, so that the content cannot be identified by human naked eyes or ears. When ordinary users illegally copy digital information and use it for a commercial or other usage without proper payment or permission, the owner of the content can disclose that the content belongs to the owner by extracting the watermark of the owner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of operating an electronic device in which at least one message can be included in a content by using a watermark scheme, and the at least one message inserted to the content can be displayed through a designated security key.

In accordance with an aspect of the present disclosure, a method of operating an electronic device is provided. The method includes creating a security key based on data shared with a specific electronic device, creating security configuration information and a watermarking content based on the security key, and transmitting the security configuration information and the watermarking content to the specific electronic device.

In accordance with another aspect of the present disclosure, a method of operating an electronic device is provided. The method includes receiving security configuration information and a watermarking content from a specific electronic device, creating a security key based on the security control information and data shared with the specific electronic device, and displaying the watermark corresponding to the security key on the watermarking content.

In accordance with another aspect of the present disclosure, an electronic device is provided. The electronic device includes a communication module connected to a specific electronic device through wireless communication, and a processor configured to control the communication module to create a security key based on data shared with the specific electronic device, to create security configuration information and a watermarking content based on the security key, and to transmit the security configuration information and the watermarking content to the specific electronic device.

In accordance with another aspect of the present disclosure, an electronic device is provided. The electronic device includes a communication module connected to a specific electronic device through wireless communication, a display configured to display data transmitted/received with respect to the specific electronic device, and a processor configured to control receiving of security configuration information and a watermarking content through the communication module from the specific electronic device, to create a security key based on the security configuration information and data shared with the specific electronic device, and to display a watermark corresponding to the security key to the display by inserting the watermark to the watermarking content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
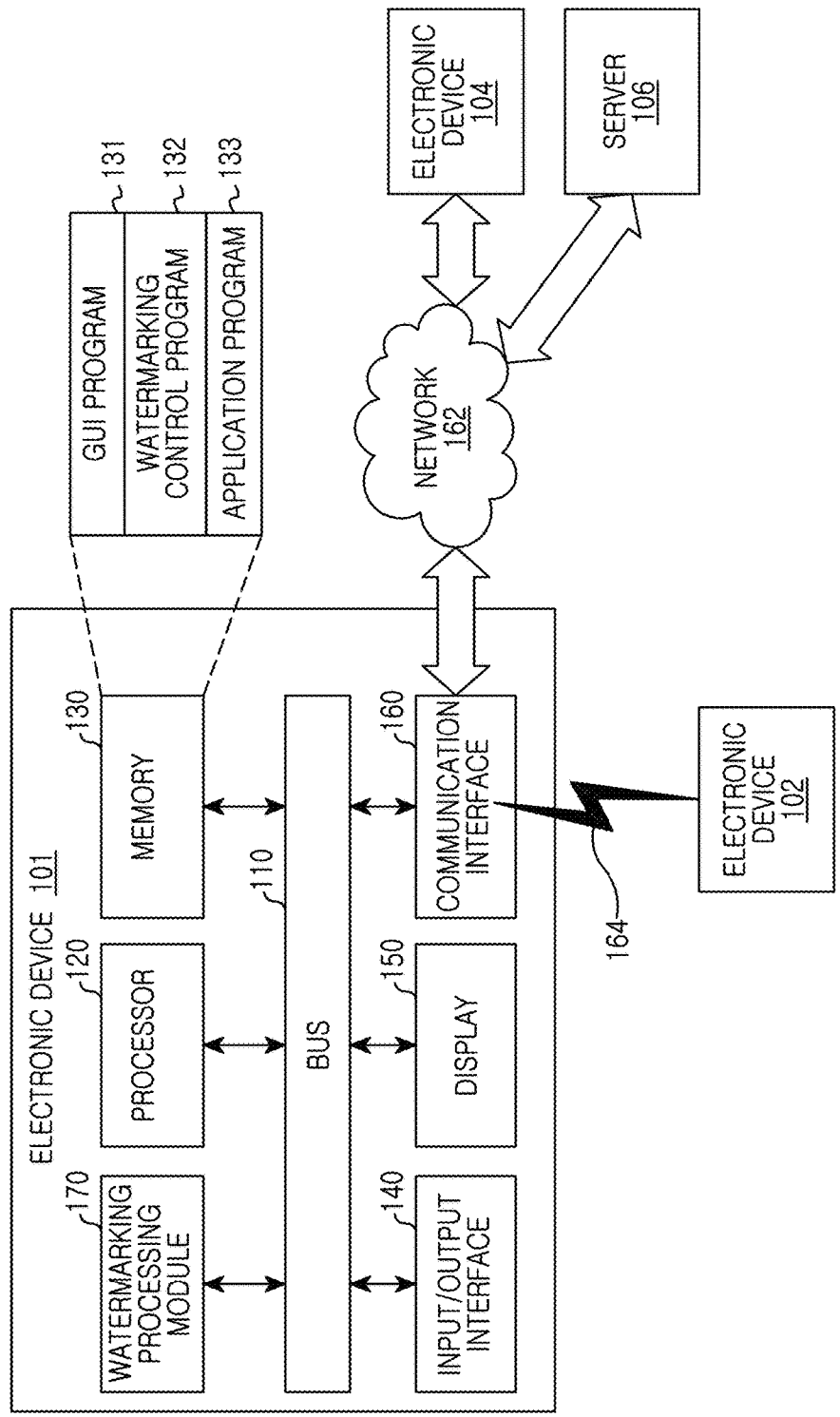
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The expression "include" or "may include" used in the various embodiments of the present disclosure is intended to indicate a presence of a corresponding function, operation, or constitutional element disclosed herein, and it is not intended to limit a presence of one or more functions, operations, or constitutional elements. In addition, in the various embodiments of the present disclosure, the term "include" or "have" is intended to indicate that characteristics, numbers, operations, constitutional elements, and components disclosed in the specification or combinations thereof exist, and thus should be understood that there are additional possibilities of one or more other characteristics, numbers, operations, constitutional elements, components or combinations thereof.

In various embodiments of the present disclosure, an expression "or" includes any and all combinations of words enumerated together. For example, "A or B" may include A or B, or may include both of A and B.

Although expressions used in various embodiments of the present disclosure, such as "$1^{st}$", "$2^{nd}$", "first", "second" may be used to express various constitutional elements of the present disclosure, it is not intended to limit the corresponding constitutional elements. For example, the above expressions are not intended to limit an order and/or an importance of the corresponding constitutional elements. The above expressions may be used to distinguish one constitutional element from another constitutional element.

According to various embodiments of the present disclosure, when a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

The terminology used in various embodiments of the present disclosure is for the purpose of describing particular embodiments only and is not intended to be limiting of the present disclosure. Further, all terms (including technical and scientific terms) used herein have the same meaning as commonly understood by those ordinarily skilled in the art to which the present disclosure belongs. It will be further understood that terms, such as those defined in commonly used dictionaries, should be interpreted as having a meaning that is consistent with their meaning in the context of the relevant art and the various embodiments of the present disclosure, and will not be interpreted in an idealized or overly formal sense unless expressly so defined herein.

An electronic device according to various embodiments of the present disclosure may be a device having a communication function. For example, the electronic device may include at least one of a smart phone having a communication function, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, and the like), various medical devices (e.g., Magnetic Resonance Angiography (MRA), Magnetic Resonance Imaging (MRI), Computed Tomography (CT), imaging equipment, ultrasonic instrument, and the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, and the like), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, and the like. The electronic device according to an embodiment of the present disclosure may be one or more combinations of the aforementioned various devices. In addition, it is apparent to those ordinarily skilled in the art that the electronic device according to an embodiment of the present disclosure is not limited to the aforementioned devices.

Hereinafter, an electronic device according to various embodiments of the present disclosure will be described with reference to the accompanying drawings. The term 'user' used in the various embodiments may refer to a person who uses the electronic device or a device (e.g., an Artificial Intelligence (AI) electronic device) which uses the electronic device.

FIG. 1 illustrates a network environment including an electronic device according to various embodiments of the present disclosure.

Referring to FIG. 1, an electronic device 101 may include a bus 110, a processor 120, a memory 130, an input/output interface 140, a display 150, a communication interface 160, a watermarking processing module 170, a microphone, and a speaker.

The bus 110 may be a circuit for connecting the aforementioned constitutional elements to each other and for delivering a communication signal (e.g., a control message) between the aforementioned constitutional elements.

The processor 120 may receive an instruction from the aforementioned different constitutional elements (e.g., the memory 130, the input/output interface 140, the display 150, the communication interface 160, or the watermarking processing module 170), for example, via the bus 110, and thus may interpret the received instruction and execute arithmetic or data processing according to the interpreted instruction.

The memory 130 may store an instruction or data received from the processor 120 or different constitutional elements (e.g., the input/output interface 140, the display 150, the communication interface 160, or the watermarking processing module 170) or generated by the processor 120 or the different constitutional elements. The memory 130 may include, for example, a Graphical User Interface (GUI) program 131, a watermarking control program 132, or an application program 133. At least one program (or application) is stored in the memory in the electronic device 101. In this case, each program may be configured with at least one programming module. Each of the aforementioned programming modules may consist of software, firmware, or hardware entities or may consist of at least two or more combinations thereof.

The GUI program 131 may include at least one instruction software constitutional elements for providing a user interface in a display of the electronic device 101. According to an embodiment of the present disclosure, the GUI program 131 may be a program for configuring a content (e.g., an image) provided through the display by including a designated watermark. The GUI program 131 may be a program for displaying a mark which indicates that the watermark is included or for displaying a designated effect together with the designated watermark when the content including the watermark is displayed based on designated configuration information.

The watermarking control program 132 may be a program for creating a watermarking content by inserting a watermark to a designated content of the electronic device 101. The watermarking control program 132 may be a program for determining a security key based on information shared with at least one different electronic device (e.g., another electronic device 102) when determining a secret key for displaying the designated watermark in the watermarking content. It may be a program for determining the security key based on security configuration information capable of determining the security key of the watermarking content when the electronic device 101 displays the watermarking content to the display 150. The watermarking control program 132 may be a program for determining the security key based on security configuration information received together with the watermarking content in information shared with the designated electronic device when displaying the watermarking content. The watermarking control program 132 may be a program for transmitting/receiving a watermarking content created using watermarking data with respect to the different electronic device (e.g., the other electronic device 102). Herein, the watermarking data may include at least one of a watermarking content, an original content of the watermarking content, a watermark included in the watermarking content, security configuration information, and information regarding a method of displaying a watermark on the original content. The watermarking control program 132 may be a program for determining a secret key based on the security configuration information included in the watermarking data. The watermarking control program 132 may be a program for configuring a secret key capable of determining the watermarking from the created watermarking content.

The application program 133 may be a program related to an information exchange between the electronic device 101 and different electronic devices (e.g., the other electronic device 102, or another electronic device 104). The program related to the information exchange may include, for example, a notification relay program for relaying specific information to the different electronic device or a device management program for managing the different electronic device. According to various embodiments of the present disclosure, the application program 133 may include a program additionally designated according to an attribute (e.g., an electronic device type) of the different electronic device (e.g., the other electronic device 102, the other electronic device 104, or a server 106).

The input/output interface 140 may relay an instruction or data input from a user via a sensor (e.g., an acceleration sensor, a gyro sensor) or an input/output device (e.g., a keyboard, or a touch screen) to the processor 120, the memory 130, the communication interface 160, or the watermarking processing module 170, for example, via the bus 110. For example, the input/output interface 140 may provide data regarding a user's touch input via the touch screen to the processor 120. In addition, the input/output interface 140 may output an instruction or data received from the processor 120, the memory 130, the communication interface 160, or the watermarking processing module 170 to an output device (e.g., a speaker or a display), for example, via the bus 110. For example, the input/output interface 140 may output audio data provided by using the processor 120 to the user via the speaker.

The display 150 may display a variety of information (e.g., multimedia data or text data) to the user. The display 150 may consist of a touch screen for inputting an instruction by touching or proximity touching an input means to the display. The touch screen may include a touch panel so that an input function and a display function can be performed simultaneously. The touch panel may include a Liquid-Crystal Display (LCD) or an Active-Matrix Organic Light-Emitting Diode (AM-OLED), and may be implemented in a flexible, transparent, or wearable manner. The touch panel may recognize a touch input by using at least one of an electrostatic type, a pressure-sensitive type, and an ultrasonic type. The touch panel may further include a controller. In case of the electrostatic type, the touch panel can recognize not only a direct touch but also a proximity touch. The proximity touch is also expressed as a non-contact touch or hovering. The touch penal may further include a tactile layer to provide the user with a tactile reaction. The touch screen may include a hologram. The hologram may use an interference of light and show a stereoscopic image in the air. In addition, the touch screen may further include a control circuit for controlling the touch panel or the hologram. Unless otherwise specified in particular in the following description, the touch screen and the touch panel may be represented by the display 150. A device area for displaying a variety of information in the display 150 may be referred to as a screen.

The communication interface 160 may connect a communication between the electronic device 101 and an external device (e.g., the other electronic device 102, the other electronic device 104, or the server 106). For example, the communication interface 160 may support a network communication 162 (e.g., Internet, Local Area Network (LAN), Wide Area Network (WAN), telecommunication network, cellular network, satellite network, Plain Old Telephone Service (POTS), and the like) and a near distance communication 164 (e.g., Wireless Fidelity (WiFi), Bluetooth (BT), Near Field Communication (NFC), or wired communication (e.g., Universal Serial Bus (USB), High Definition Multimedia Interface (HDMI), Recommended Standard (RS)-232, POTS, and the like). According to an embodiment of the present disclosure, a protocol for a communication between the electronic device 101 and the external device (e.g., a near distance communication protocol, a network communication protocol, or a wired communication protocol) may be supported in at least one of the Application Programming Interface (API) 133 and the middleware 132. Each of the other electronic devices 102 and 104 may be a device which is the same (e.g., the same type) as the electronic device 101 or may be a different (e.g., a different type) device.

The watermarking processing module 170 may create a security key based on data shared with a specific electronic device, may create security configuration information and a watermarking content by using the security key, and may transmit the security configuration information and the watermarking content to the specific electronic device.

The watermarking processing module 170 may create the watermarking content by inserting a watermark to which a security is applied by using the security key. The watermarking processing module 170 may have shared data including at least one of a log of incoming/outgoing calls with respect to the specific electronic device, a transmitted/received text message, shared time information, a shared image, a shared authentication code, a shared date, a coordinate of a shared location, or a part shared with the specific electronic device in an address book. The watermarking processing module 170 may determine information included in at least some items of the shared data as the security key. The watermarking processing module 170 may configure the security configuration information by using a hint for detecting some parts of the security key and the remaining parts other than the some parts of the security key. The watermarking processing module 170 may configure a security based on a security key corresponding to each watermark if the watermarking content includes two or more watermarks. The watermarking processing module 170 may control a designated server to determine the security key or the security control information based on the shared data.

The watermarking processing module 170 may receive the security configuration information and the watermarking content from the specific electronic device, may create the security key based on the security control information and the data shared with the specific electronic device, and may display the watermark corresponding to the security key by inserting it to the watermarking content. The watermarking processing module 170 may configure the security configuration information by using a hint for detecting some parts of the security key and the remaining parts other than the some parts of the security key. The watermarking processing module 170 may have shared data including at least one of a log of incoming/outgoing calls with respect to the specific electronic device, a transmitted/received text message, shared time information, a shared image, a shared authentication code, a shared date, a coordinate of a shared location, or a part shared with the specific electronic device in an address book. The operation of the watermarking processing module 170 may be performed by one or more processors 120, or may be performed by the watermarking processing module 170 under the control of the processor 120. Additional information regarding the watermarking processing module 170 may be provided through FIGS. 2 to 10 described below.

Figure 2:
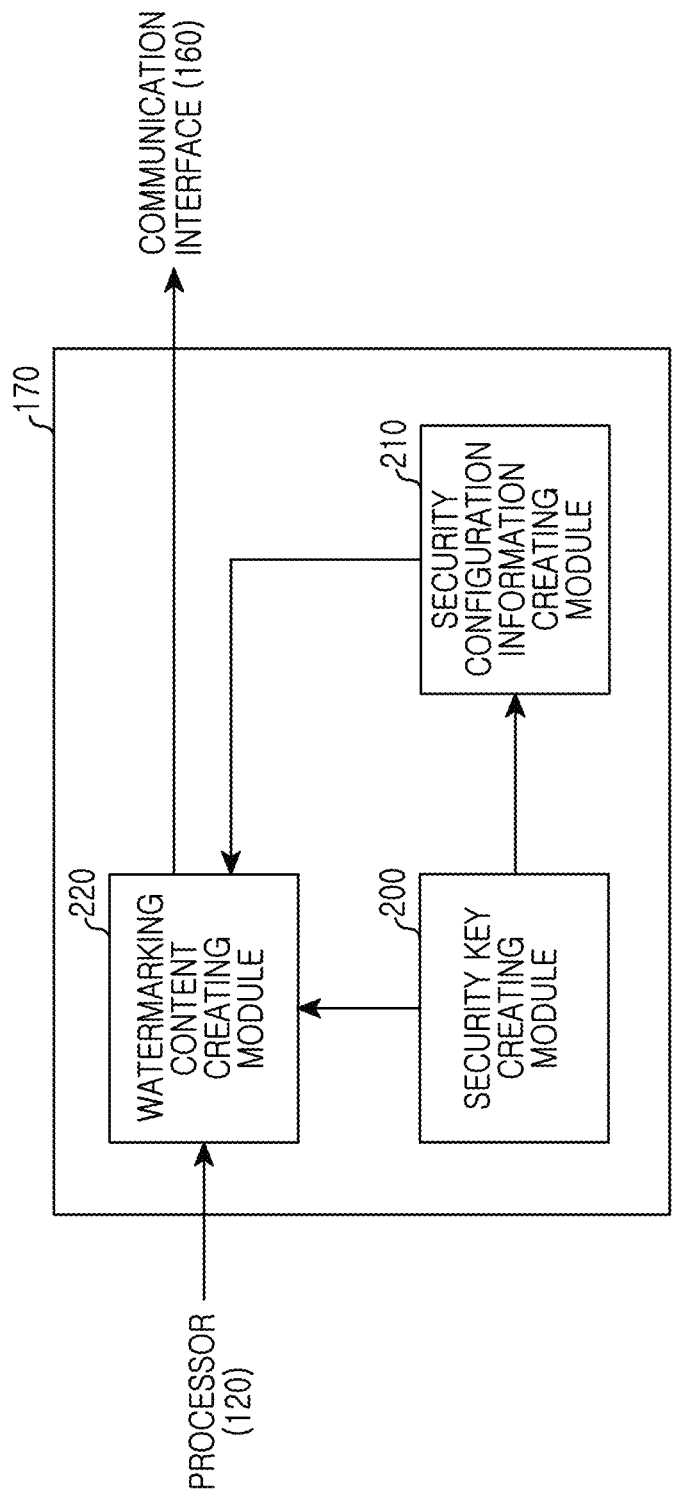
FIG. 2 is a block diagram of a watermarking control module of an electronic device according to various embodiments of the present disclosure.

FIG. 2 is a block diagram of a watermarking control module of an electronic device according to an embodiment of the present disclosure.

Referring to FIG. 2, the watermarking processing module 170 may include one or more of a watermarking content creating module 220, a security key creating module 200, and a security configuration information creating module 210.

The watermarking content creating module 220 may determine a watermarking content by inserting a watermark into a designated original content. When creating the watermarking content, the watermarking content creating module 220 may configure a security environment as to the watermark included in the watermarking content, and may configure a security key created by the security key creating module 200 as the security key to be displayed by inserting the watermark into the watermarking content. The watermarking content creating module 220 may transmit the created watermarking content to a designated different electronic device via the communication interface 160. When transmitting the watermarking content, the watermarking content creating module may transmit security configuration information created in the security configuration information creating module 210 together based on the security key created in the security key creating module 200.

The security key creating module 200 may create the security key based on data shared between the electronic device 101 and at least one designated different electronic device. If at least two electronic devices are designated, the security key creating module 200 may determine shared data selected from at least one of a call log shared between the designated electronic devices, a text, message, a program having information shared with the designated electronic device, such as a Social Network Service (SNS) (e.g., Facebook), a log of incoming/outgoing calls, shared time information, a shared image, a shared authentication code, a shared date, a coordinate of a shared location, an address book, a video, a designated sound, identification information of the designated electronic device, an Internet Protocol (IP) address of connected wireless communication, location information received through a GPS module, user identification information configured in the designated electronic device, and a birthday of a designated user. The security key creating module 200 may determine at least a part of the determined shared data as the security key.

The security configuration information creating module 210 may create security configuration information provided so that the security key is detected by a different electronic device which receives a watermarking content to which the security key is applied based on the created security key. The security configuration information creating module 210 may insert a part of the security key into the security configuration information, and may insert a hint capable of detecting the remaining parts not included in the security configuration information in the security key. The designated electronic device which receives the security configuration information may detect the security key from data shared with the electronic device 101 based on the hint and the part of security key included in the security configuration information.

Figure 3:
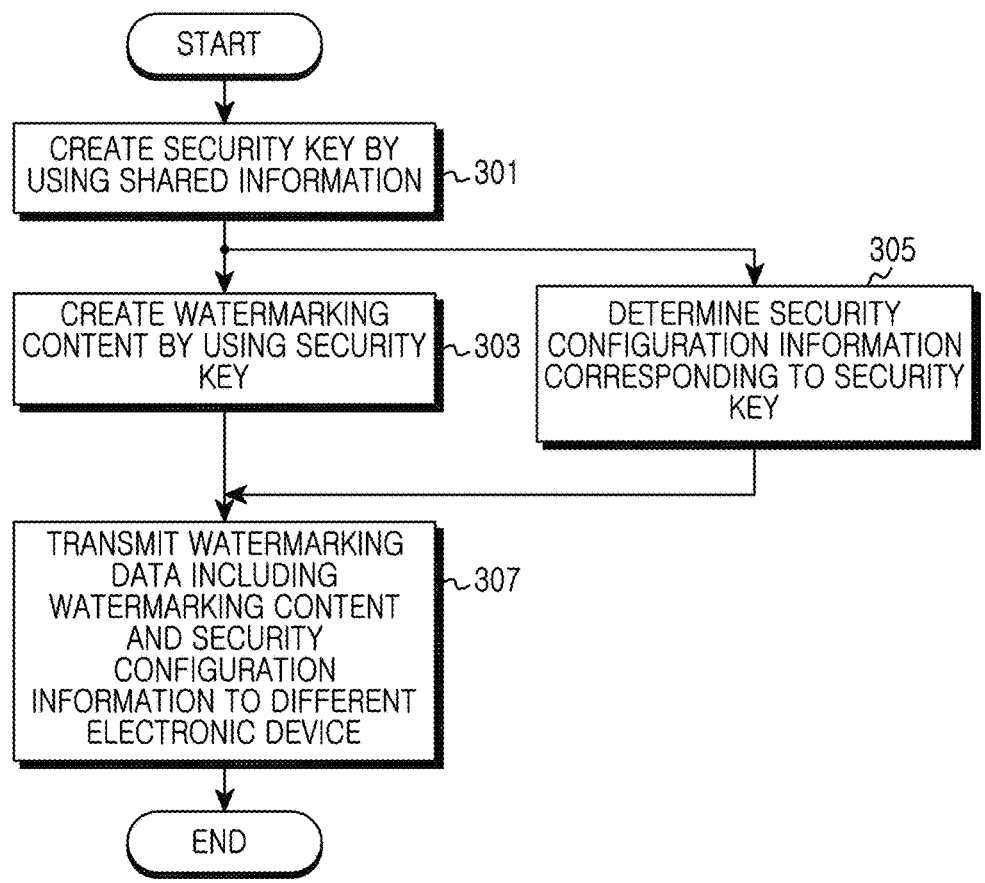
FIG. 3 is a flowchart illustrating an operation of creating a watermarking content in an electronic device according to various embodiments of the present disclosure.

FIG. 3 is a flowchart illustrating an operation of creating a watermarking content in an electronic device according to various embodiments of the present disclosure.

Referring to FIG. 3, in operation 301, the electronic device 101 may create a security key by using shared information. According to an embodiment of the present disclosure, when determining shared information used to create the security key, the electronic device 101 may determine information shared with at least one different electronic device (e.g., the other electronic device 102). For example, by referring to a call log, the electronic device 101 may determine 'call log, 2014-01-21, 07:35:56 pm, call time: 42 seconds as the security key. When determining the security key, without being limited to the reference of the call log, the electronic device 101 may determine information designated from a text message and a program having information shared with the designated electronic device, such as an SNS (e.g., Facebook) as the security key. For example, the electronic device 101 may store in the memory 130 a text message 'Will you come to my house on Sunday?' transmitted to a different electronic device (e.g., the other electronic device 102) at 2014-01-21 08:42:29 am. The electronic device 101 may determine 'text message, 2014-01-21, 08:42:49 am, on Sunday' which is a part of the text message transmitted to a phone number '011-123-4567' at '2014-01-21 08:42:29 am' with a security key of a watermarking content created by inserting a watermark to an original content, as the security key. When the electronic device 101 creates the watermarking content, information that can be used as a security key for configuration a security environment of a watermark may be determined from at least one of a log of incoming/outgoing calls with respect to at least one different electronic device, shared time information, a shared image, a shared authentication code, a shared date, a coordinate of a shared location, an address book, a video, a designated sound, identification information of the designated electronic device, an IP address of connected wireless communication, location information received through a GPS module, user identification information configured in the designated electronic device, and a birthday of a designated user.

In operation 303, the electronic device 101 may create the watermarking content based on the determined security key. The watermarking content may be a content in which a watermark is inserted at a designated location of the original content. The electronic device 101 may configure the watermarking content such that the watermarking content is displayed to the display 150 in case of including information matched to a security key used when the watermarking content is created in a different electronic device (e.g., the other electronic device 102) which receives the watermarking content. In addition, when determining the security key in the watermark included in the watermarking content, the electronic device 101 may configure a watermark to which two or more security keys are applied. In this case, when confirming the watermark included in the watermarking content, the watermark may be confirmed when two or more security keys configured in the watermark are all satisfied.

When the electronic device 101 creates the watermarking content, information regarding a location, shape, and effect for displaying the watermark in the original content may be included in the watermarking content, or may be included in data independent of the watermarking content or watermarking data including the watermarking content. Herein, the watermarking data may be package-type data including a variety of information required to configure the watermarking content in which the watermark is inserted to the original content. According to an embodiment of the present disclosure, the watermarking data may include at least one of the watermark, the original content, the watermarking content, information including the information regarding the location, shape, and effect for displaying the watermark on the original content, and security configuration information.

In operation 305, the electronic device 101 may determine at least a part of a security key used in the creation of the watermarking content as the security configuration information. According to an embodiment of the present disclosure, the electronic device 101 may transmit the determined security configuration information to a different electronic device (e.g., the other electronic device 102) by inserting the information to the watermarking data. The different electronic device (e.g., the other electronic device 102) which receives the watermarking data transmitted by the electronic device 101 may determine a security key stored in a memory based on the security configuration information included in the watermarking data, and may display the watermarking content. According to an embodiment of the present disclosure, if the electronic device 101 determines 'call log, 2014-01-21, 07:35:56 pm, call time: 42 seconds as the security key of the watermarking content, the security configuration information may be configured as a part of a security key, for example, 'call log, 2014-01-21, 07:35:56 pm, call time: ?'. In this case, the different electronic device (e.g., the other electronic device 102) which receives the security configuration information may determine 'call time: 42 seconds corresponding to '2014-01-21, 07:35:56 pm' by referring to a call log based on the security configuration information 'call log, 2014-01-21, 07:35:56 pm, call time: ?', and may determine a security key 'call log, 2014-01-21, 07:35:56 pm, call time: 42 seconds. If the determined security key 'call log, 2014-01-21, 07:35:56 pm, call time: 42 seconds is matched to the security key of the watermarking content (e.g., 'call log, 2014-01-21, 07:35:56 pm, call times: 42 seconds), the different electronic device (e.g., the other electronic device 102) may display the watermarking content including the watermark.

In operation 307, the electronic device 101 may transmit the watermarking content and the security configuration information to a designated different electronic device (e.g., the other electronic device 102). The watermarking content transmitted by the electronic device 101 may include the original content and the watermark. When transmitting the watermarking content to the different electronic device (e.g., the other electronic device 102), the electronic device 101 may transmit the watermarking content and the security configuration information, or may transmit watermarking data including the watermarking content and the security configuration information.

When the electronic device 101 performs the operation 307, the embodiment of FIG. 3 may end.

Figure 4:
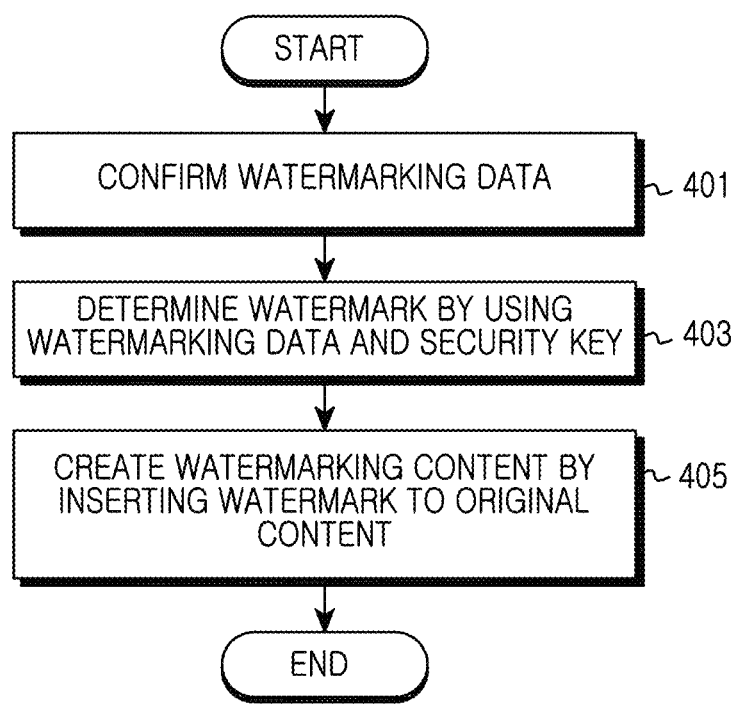
FIG. 4 is a flowchart illustrating an operation of configuring a watermarking content designated based on watermarking data in an electronic device according to various embodiments of the present disclosure.

FIG. 4 is a flowchart illustrating an operation of configuring a watermarking content designated based on watermarking data in an electronic device according to various embodiments of the present disclosure.

Referring to FIG. 4, in operation 401, the electronic device 101 may confirm watermarking data stored in the memory 130 or received from a different electronic device. Herein, the watermarking data may include a watermarking content, and may include at least one security configuration information. The watermarking content included in the watermarking data may be configured with an original image and a watermark, and may be configured with security configuration information and data for displaying information regarding a location, shape, and effect for displaying the watermark on the original content.

In operation 403, the electronic device 101 may detect the watermark included in the watermarking content by using a security key. The electronic device 101 may determine the security key by detecting information matched to security configuration information stored in the memory 130 of the electronic device 101 based on the security configuration information included in the watermarking data. According to an embodiment of the present disclosure, the electronic device 101 may confirm the security configuration information included in the watermarking data, i.e., '2014-01-21, 08:42:49 am, $8^{th}$ word?'. The electronic device 101 may determine a text message transmitted or received at '2014-01-21 08:42:49 am' from a received/received text message stored in the memory 130. For example, the electronic device 101 may confirm a text message transmitted at '2014-01-21 08:42:49 am' from the memory 130, that is, 'Will you come to my house on Sunday?', and may determine an $8^{th}$ word 'Sunday'. The electronic device 101 may determine a security key 'text message, 2014-01-21, 08:42:49 am, to my house' based on the security configuration information 'text message, 2014-01-21, 08:42:49 am, $8^{th}$ word?'. The electronic device 101 may determine a watermark corresponding to the security key 'text message, 2014-01-21, 08:42:49 am, to my house' from the watermarking content.

According to various embodiments of the present disclosure, the watermarking content may include two or more watermarks (e.g., a first watermark, a second watermark), and each watermark may be in a state of being included in a watermarking content through each security key (e.g., a first security key corresponding to the first watermark, a second security key corresponding to the second watermark). Further, the watermarking content may include each security configuration information (e.g., first security configuration information, second security configuration information) based on each security key (e.g., the first security key, the second security key). In other word, the watermarking content may be a content in which two or more watermarks are inserted to one original content by applying a security key corresponding to each watermark. According to an embodiment of the present disclosure, the electronic device 101 may complete the first security key if information matched to the first security configuration information is attained. Likewise, the electronic device 101 may complete the second security key if information matched to the second security configuration information is attained. The electronic device 101 may determine a watermark corresponding to the first security key and/or the second security key in watermarking data.

In operation 405, the electronic device 101 may determine a watermarking content in which the determined watermark is included at a designated location of the original content. According to an embodiment of the present disclosure, when displaying the watermarking content to the display 150, the electronic device 101 may display the original content and may display the designated watermark at the designated location of the original content.

According to various embodiments of the present disclosure, if two or more watermarks (e.g., the first watermark, the second watermark) are included in the watermarking data, the electronic device 101 may complete a corresponding security key based on each provided security configuration information (e.g., the first security configuration information, the second security configuration information), and may display a watermark matched to the security key configured in the watermarking content to the original content. According to an embodiment of the present disclosure, the watermarking content may include the first watermark configured with the first security key and the second watermark configured with the second security key. The electronic device 101 may acquire information matched in the electronic device 101 based on the provided first security configuration information and second security configuration information. According to an embodiment of the present disclosure, the electronic device 101 may complete the first security key based on information matched to the first security configuration information, and may not acquire information matched to the first security configuration information (the other way around may also be possible). If the complete security key (e.g., the first security key) is not matched to the security key applied to the watermarking content, the electronic device 101 may display the watermarking content to which the first watermark is applied. Herein, the watermarking content to which the first watermark is applied may be displayed by applying the first watermark to the original content when the electronic device 101 displays the watermarking content to the display 150.

According to an embodiment of the present disclosure, the electronic device 101 may complete the first security key based on the first security configuration information, and may complete the second security key based on the second security configuration information. The electronic device 101 may input the first security key or the second security key to the watermarking data in which a security is configured with at least one security key. The electronic device 101 may confirm a watermark corresponding to the first security key or second security key matched to the security key configured in the watermarking content. For example, if both of the first security key and the second security key are matched to the security key configured in the watermarking content, the electronic device 101 may confirm the first watermark corresponding to the first security key and the second watermark corresponding to the second security key, and may display a watermarking content in which the first watermark and the second watermark are inserted to the original content to the display 150.

When the electronic device 101 performs the operation 405, the embodiment of FIG. 4 may end.

Figure 5:
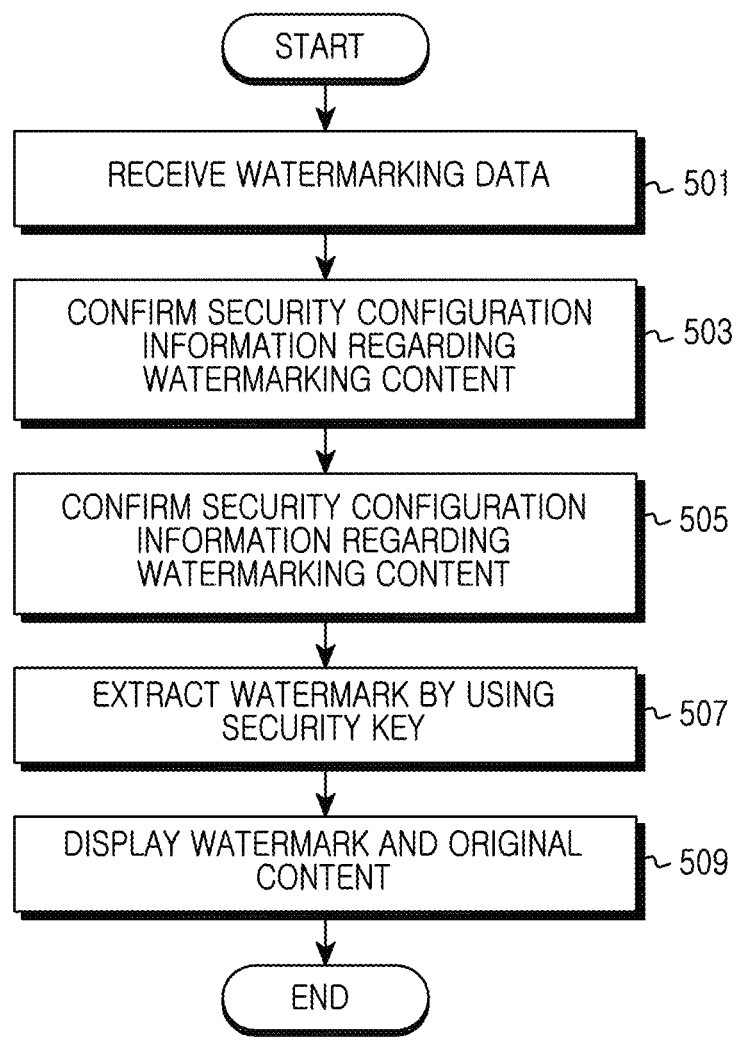
FIG. 5 is a flowchart illustrating an operation of configuring a watermarking content designated based on watermarking data in an electronic device according to various embodiments of the present disclosure.

FIG. 5 is a flowchart illustrating an operation of configuring a watermarking content designated based on watermarking data in an electronic device according to various embodiments of the present disclosure.

Referring to FIG. 5, in operation 501, the electronic device 101 may confirm watermarking data. The watermarking data confirmed in the electronic device 101 may be data received in an electronic device (e.g., the other electronic device 102 or the server 106) based on wired/wireless communication or a storage medium.

In operation 503, the electronic device 101 may detect security configuration information included in the received watermarking data. The security configuration information may be information for detecting a security key of a security environment configured in at least one watermark inserted to the watermarking content included in the watermarking data received in the electronic device 101. The information for detecting the security key may be configured with a part of the security key and a hint provided to detect the remaining parts other than a part provided to the security configuration information in the security key. According to an embodiment of the present disclosure, regarding a security key of the first watermark configured in the watermarking content, in a call log shared between the electronic device 101 and a different electronic device (e.g., the other electronic device 102) which creates the security key of the watermarking content, "2014-02-01, 11:21:54 am, call time: 21 seconds" may be determined as the security key, and "2014-02-01, 11:--:--am, call time: 21 seconds, minutes and seconds of transmission time?" may be determined as the security configuration information. Herein, the security configuration information may be configured with a part of the security key, i.e., '2014-02-01, 11:--:--am, call time: 21 seconds and a hint minutes and seconds of transmission time?' that can determine the remaining part '21:54' other than the provided part.

In operation 505, the electronic device 101 may determine the security key based on the security configuration information included in the watermarking data. According to an embodiment of the present disclosure, the electronic device may include information of '2014-02-01, 11:21:54 am, call time: 21 seconds in a call log with respect to the other electronic device 102. The electronic device 101 may search for information corresponding to the security configuration information '2014-02-01, 11:--:--am, call time: 21 seconds, minutes and seconds of transmission time?'. The electronic device 101 may detect at least one information matched in a call log based on '2014-02-01, 11:--:--am, call time: 21 seconds, and may complete the security key '2014-02-01, 11:21:54 am, call time: 21 seconds based on the hint 'minutes and seconds of transmission time?'.

In operation 507, the electronic device 101 may extract (or detect) a watermark corresponding to a security key from a watermarking content based on the security key. According to an embodiment of the present disclosure, the electronic device 101 may cancel the security configuration of a watermark hidden in the watermarking content (or a watermark in which a security is configured not to be displayed) through the determined security key. If the watermarking content is displayed to the display 150, the electronic device 101 may determine information, such as a location for displaying the watermark and an effect to be applied, based on configuration information of the watermarking content. According to an embodiment of the present disclosure, the configuration information of the watermarking content may be information included in the watermarking data.

In operation 509, the electronic device 101 may display a watermark designated to be displayed through the security key at a designated location of the watermarking content. According to an embodiment of the present disclosure, when displaying the watermarking content to the display 150, the electronic device 101 may display the watermark in the original content by referring to configuration information of the watermarking content based on the original content included in the watermarking data, a watermark corresponding to the security key, and configuration information of the watermarking content.

When the electronic device 101 performs the operation 509, the embodiment of FIG. 5 may end.

Figure 6:
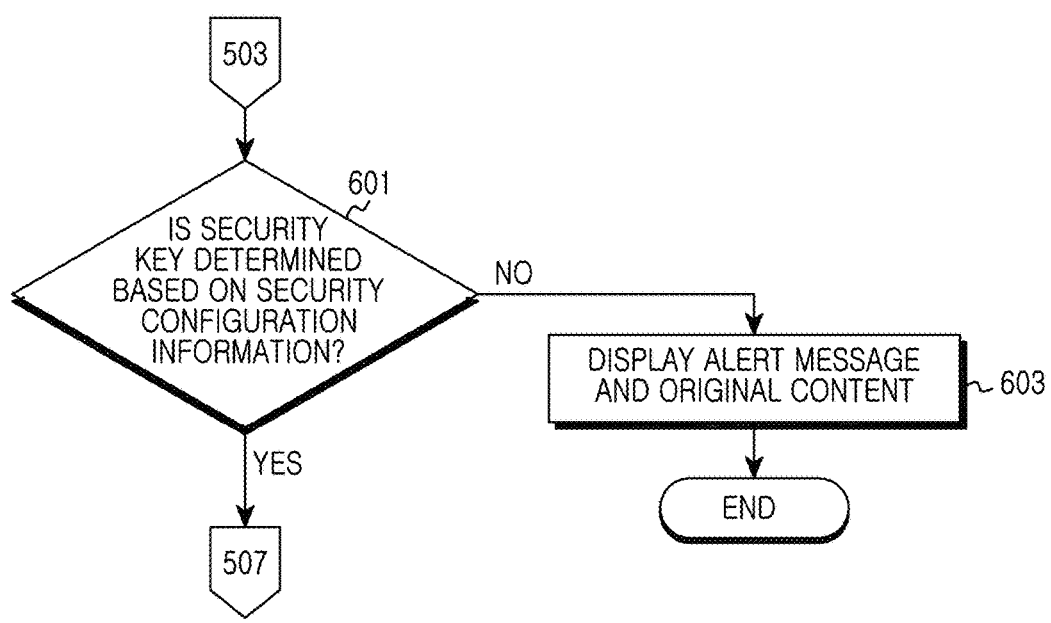
FIG. 6 is a flowchart illustrating an operation based on a validity of a security key in an electronic device according to various embodiments of the present disclosure.

FIG. 6 is a flowchart illustrating an operation based on a validity of a security key in an electronic device according to various embodiments of the present disclosure.

Referring to FIG. 6, after the electronic device 101 performs the operation 503 of FIG. 5, various embodiments of the present disclosure that can be performed in the operation 505 are shown. An operation 601 or 603 of FIG. 6 may be an operation included in the operation 505 of FIG. 5 or may be an operation replaced with the operation 505.

In operation 601, the electronic device 101 may determine whether the security key determined based on the security configuration information is matched to at least one security key determined in the watermarking content. The electronic device 101 may compare the security key determined based on the security configuration information with at least one security key determined in the watermarking content. If the security key determined based on the security configuration information is matched to the at least one security key determined in the watermarking content, the electronic device 101 may perform the operation 507 (e.g., the operation 507 of FIG. 5), and otherwise, may perform the operation 603.

In operation 603, the electronic device 101 may display to the display 150 the watermarking content in a state where the determined security key is not matched to the security key determined in the watermarking content. If the security keys are not matched to each other, the electronic device 101 may display an original content which does not display the watermark included in the watermarking content. Alternatively, the electronic device 101 may display an alert message designated to an incorrect security key (e.g., a mismatched security key) at the designated location of the watermarking content. According to an embodiment of the present disclosure, the operation of displaying the designated alert for the incorrect security key may be an operation of displaying an alert indicating that the electronic device 101 cannot determine the security key determined in the watermarking content, which is matched to the security key determined based on the security configuration information.

When the electronic device 101 performs the operation 603, the embodiment of FIG. 6 may end.

Figure 7A:
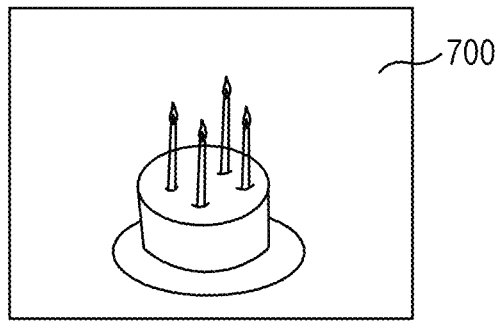
FIGS. 7A and 7B illustrate a display of a watermarking content in an electronic device according to various embodiments of the present disclosure.
Figure 7B:
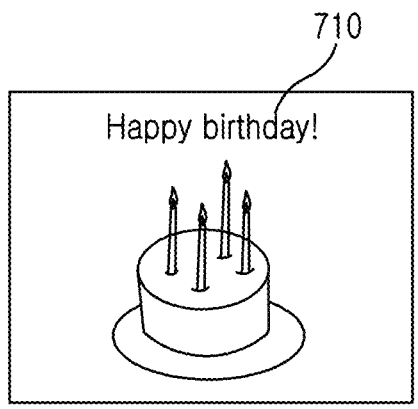

FIGS. 7A and 7B illustrate a display of a watermarking content in an electronic device according to various embodiments of the present disclosure.

Referring to FIG. 7A, the electronic device 101 may be an original content 700 of the watermarking content. The original content 700 of watermarking data may be an image in a state in which a watermark is not displayed. The electronic device 101 may determine a security key determined in the watermarking content based on security configuration information provided together with the watermarking content, and may detect a watermark 710 corresponding to the security key.

Referring to FIG. 7B, the electronic device 101 may determine a security key determined in the watermarking content based on security configuration information provided together with the watermarking content, and may detect a watermark corresponding to the security key. When displaying the watermarking content to the display 150, the electronic device 101 may display the watermark 710 corresponding to the security key at a designated location of the original content 700. When determining the designated location of the original content 700, the electronic device 101 may refer to configuration information of the watermarking content. Herein, the configuration information of the watermarking content may be provided by being included in the watermarking content, and may be included in watermarking data if at least one of the watermarking content, the security configuration information, and the watermark is provided by being included in the watermarking data.

FIGS. 8A, 8B, 8C, and 8D illustrate a display of a watermark when two or more watermarks are included in a watermarking content in an electronic device according to various embodiments of the present disclosure.

Figure 8A:
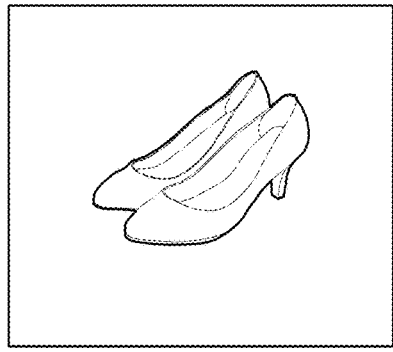
FIGS. 8A, 8B, 8C, and 8D illustrate a display of a watermark when two or more watermarks are included in a watermarking content in an electronic device according to various embodiments of the present disclosure.

Referring to FIG. 8A, the watermarking content may be configured to display the two or more watermarks. In this case, each watermark may be configured in the watermarking content based on a security environment corresponding to each security key. The watermarking content received in the electronic device 101 may include at least one watermark corresponding to a security key based on at least one security key. If a determined security key is input, the watermark included in the watermarking content may be displayed to the display 150 by being inserted to a designated location of an original content.

According to an embodiment of the present disclosure, the electronic device 101 (e.g., a first electronic device) may determine a first security key in a log of calls with a second electronic device, and may create first security configuration information based on the determined first security key. The first electronic device may determine the first security key as a security key of a security environment of a first watermark 810. If the first security key is input, the first watermark 810 of the watermarking content may be displayed at a designated location of an original content 800.

According to an embodiment of the present disclosure, the first electronic device may determine a second security key in a text message with respect to a third electronic device, and may create second security configuration information based on the determined second security key. The first electronic device may determine the second security key as a security key of a security environment of a second watermark 820. If the second security key is input, the second watermark 820 of the watermarking content may be displayed at a designated location of the original content 800.

According to an embodiment of the present disclosure, the first electronic device may determine a third security key in an address book with respect to a fourth electronic device, and may create third security configuration information based on the determined third security key. The first electronic device may determine the third security key as a security key of a security environment of a third watermark 830. If the third security key is input, the third watermark 830 of the watermarking content may be displayed at a designated location of the original content 800.

When transmitting the watermarking content to a different electronic device (e.g., the second electronic device, the third electronic device, or the fourth electronic device), the first electronic device 101 may transmit the first security configuration information, the second security configuration information, and the third security configuration information together.

Figure 8B:

Referring to FIG. 8B, upon receiving the watermarking content, the second electronic device may receive the first security configuration information, the second security configuration information, and the third security configuration information. The second electronic device may determine the first security key from a call log of the second electronic device based on the first security configuration information, and may not be able to determine the second security key and third security key corresponding to the second security configuration information and third security configuration information. The second electronic device may detect the first watermark 810 corresponding to the first security key in the watermarking content, and may display the watermarking content including the first watermark 810 to a display of the second electronic device.

Figure 8C:

Referring to FIG. 8C, upon receiving the watermarking content, the third electronic device may receive the first security configuration information, the second security configuration information, and the third security configuration information. The third electronic device may determine the second security key from a text message of the third electronic device based on the second security configuration information, and may not be able to determine the first security key and third security key corresponding to the first security configuration information and third security configuration information. The third electronic device may detect the second watermark 820 corresponding to the second security key in the watermarking content, and may display the watermarking content including the second watermark 820 to a display of the third electronic device.

Figure 8D:

Referring to FIG. 8D, upon receiving the watermarking content, the fourth electronic device may receive the first security configuration information, the second security configuration information, and the third security configuration information. The fourth electronic device may determine the third security key from an address book of the fourth electronic device based on the third security configuration information, and may not be able to determine the first security key and second security key corresponding to the first security configuration information and second security configuration information. The fourth electronic device may detect the third watermark 830 corresponding to the third security key in the watermarking content, and may display the watermarking content including the third watermark 830 to a display of the fourth electronic device.

Figure 9A:
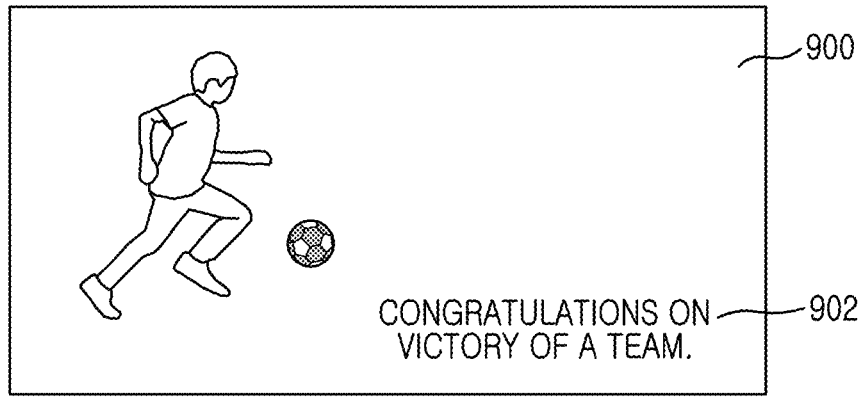
FIGS. 9A and 9B illustrate a display of a watermark when two or more watermarks are included in a watermarking content in an electronic device according to various embodiments of the present disclosure.
Figure 9B:
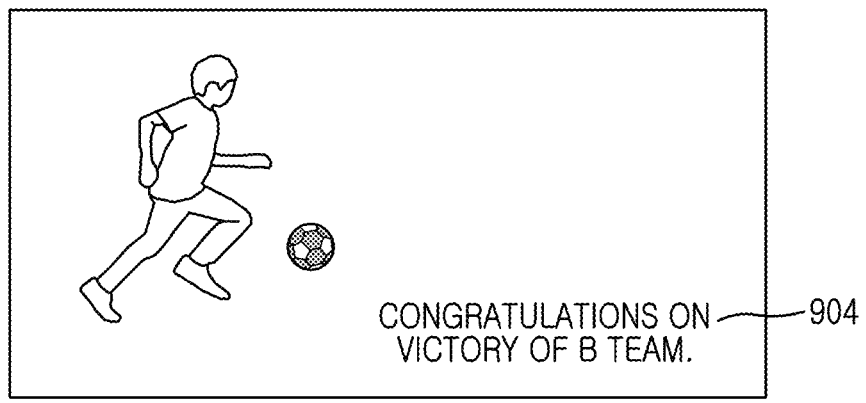

FIGS. 9A and 9B illustrate a display of a watermark when two or more watermarks are included in a watermarking content in an electronic device according to various embodiments of the present disclosure.

Referring to FIG. 9A, the electronic device 101 may create the watermarking content by inserting the two or more watermarks to an original content 900. The electronic device 101 may configure a security key designated to each watermark included in the watermarking content as a security key corresponding to a security environment of the watermark. According to an embodiment of the present disclosure, the electronic device 101 may have a first watermark 902 included in the original content 900, and may determine a first security key based on data shared with a first group as a security key of a security environment for the first watermark 902. The electronic device 101 may have a second watermark 904 included in the original content 900, and may determine a second security key based on data shared with a second group as a security key of a security environment for the second watermark 904. The electronic device 101 may transmit a watermarking content including the first watermark 902 and the second watermark 904 to at least one electronic device connected to the first group and the second group. When transmitting the watermarking content, the electronic device 101 may transmit it via the server 106 connected to the first group and the second group.

Referring to FIG. 9A, the electronic device 101 may broadcast first security configuration information created based on a first security key via the server 106 at a designated time. A designated electronic device of the first group for receiving the first security configuration information via the server may determine the first security key corresponding to the first security configuration information based on the data shared with the first group, and may detect the first watermark 902 included in the watermarking content. The designated electronic device may display to a display the watermarking content to which the first watermark 902 is inserted.

Referring to FIG. 9B, the electronic device 101 may broadcast second security configuration information created based on a second security key via the server 106 at a designated time. A designated electronic device of the second group for receiving the second security configuration information via the server may determine the second security key corresponding to the second security configuration information based on the data shared with the second group, and may detect the second watermark 904 included in the watermarking content. The designated electronic device may display to a display the watermarking content to which the second watermark 904 is inserted.

Figure 10:
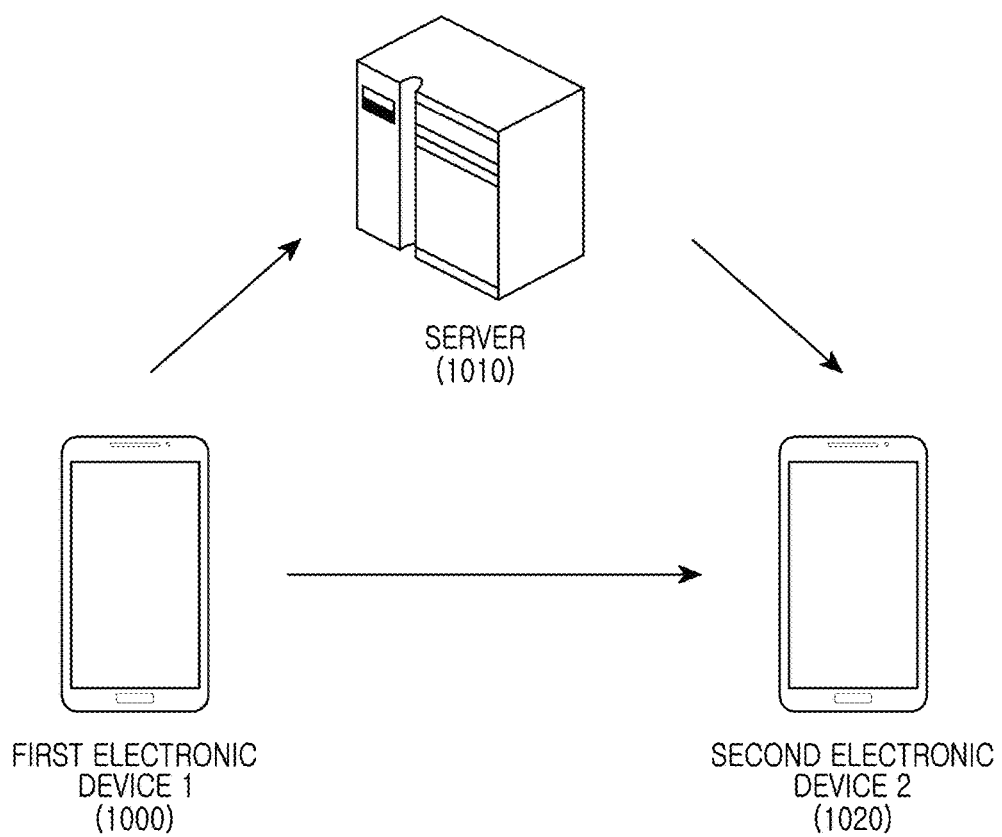
FIG. 10 illustrates an operation of transmitting a watermarking content created in an electronic device according to various embodiments of the present disclosure.

FIG. 10 illustrates an operation of transmitting a watermarking content created in an electronic device according to various embodiments of the present disclosure.

Referring to FIG. 10, when creating the watermarking content, the electronic device 101 (e.g., a first electronic device 1000 of FIG. 10) may be configured to display at least one watermark to an original content. When the watermark included in the watermarking content is configured to be displayed to the display, the first electronic device 1000 may configure a security environment in which a designated security key is input. The first electronic device 1000 may not determine a security key at a time of creating the watermarking content to which the watermark is inserted. The first electronic device 1000 may transmit the created watermarking content to the designated server 106 (e.g., a server 1010), and may transmit information regarding a target electronic device (e.g., a second electronic device 1020) for transmitting the created watermarking content together. The server 1010 may determine information shared with the first electronic device 1000 and the second electronic device 1020 based on the watermarking content received from the first electronic device 1000 and information regarding the second electronic device 1020 for transmitting the watermarking content, and may determine a part of the shared information as the security key. The server 1010 may transmit at least one of the security key and security configuration information created based on the security key to the first electronic device 1000 or the second electronic device 1020. Upon receiving the security key and/or the security configuration information from the server 1010, the first electronic device 1000 may apply the received security key to the watermark included in the watermarking content. The first electronic device 1000 may transmit to the second electronic device 1020 the watermarking content to which the security key is applied and the security configuration information created based on the security key.

According to various embodiments of the present disclosure, the electronic device 101 may perform an operation of the server 1010 for determining the security key by receiving from a specific electronic device a content to which the security key is not applied.

According to various embodiments of the present disclosure, the electronic device 101 may determine the security key based on data shared with a designated electronic device, and may provide a watermarking method for inserting a designated message to a content based on the determined security key, thereby being able to reduce a leakage possibility for the security key of the provided content.

Various embodiments of the present disclosure may be performed by at least one of one or more programs included in a memory of the electronic device 101, one or more processors (e.g., the processor 120), and the content processing module 270.

According to various embodiments of the present disclosure, at least a part of an apparatus and method according to various embodiments disclosed in the claims and/or specification of the present disclosure may be implemented in a form (e.g., a module) including two or more combination of hardware, software, and firmware. The "module" may be a minimum unit of an integrally constituted component or may be a part thereof. The "module" may be a minimum unit for performing one or more functions or may be a part thereof. The "module" may be mechanically or electrically implemented. When implemented in software, computer-interpretable storage medium (or a non-transitory computer-readable storage medium) for storing one or more programs (or programming modules) may be provided. For example, the software may be implemented with an instruction stored in a non-transitory computer-readable storage medium in a programming module form. The one or more programs include instructions for allowing the electronic device to execute the methods based on the embodiments disclosed in the claims and/or specification of the present disclosure. If the instruction is executed by one or more processors (e.g., the processor 120), the one or more processors may perform a function corresponding to the instruction. The non-transitory computer-readable storage media may be, for example, the memory 130. At least some parts of the programming module may be implemented (e.g., executed), for example, by the processor 120. At least some parts of the programming module may include modules, programs, routines, sets of instructions, processes, and the like, for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

According to various embodiments of the present disclosure, at least one non-transitory processor readable medium for storing a computer program of instructions configured to be readable by at least one processor for instructing the at least one processor to execute a computer process for performing the method is provided. The method includes creating a security key based on data shared with a specific electronic device, creating security configuration information and a watermarking content based on the security key, and transmitting the security configuration information and the watermarking content to the specific electronic device.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Further, the program may be stored in an attachable storage device capable of accessing the electronic device through a communication network, such as the Internet, an Intranet, a LAN, a Wide LAN (WLAN), or a Storage Area Network (SAN) or a communication network configured by combining the networks. The storage device may access an electronic device via an external port. Further, an additional storage device may access a portable electronic device on a communication network. The aforementioned hardware device may be configured to operate as one or more software modules to perform the operation for various embodiments of the present disclosure, and the other way around is also possible.

The module or programming module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A non-transitory computer-readable storage medium having a computer-readable program stored therein, wherein the computer readable program, when executed by a computing device, causes the computing device to perform:
   identifying a first call log among call logs with a specific electronic device for transmitting a first watermarking content;
   creating, based on the identified first call log, a first watermarking content comprising a first watermark to which a security is applied;
   creating first information associating with the identified first call log for causing the specific electronic device to identify a call log corresponding to the identified first call log;
   transmitting the created first information and the created first watermarking content to the specific electronic device;
   receiving a second information and a second watermarking content from another electronic device;
   identifying, based on the received second information, a second call log corresponding to a call log used by the another electronic device when creating the second watermarking content;
   extracting a second watermark from the received second watermark content using the identified second call log; and
   displaying the extracted second watermark on an original content.

2. The non-transitory computer-readable storage medium of claim 1, wherein the first information comprises a part of the first call log and a hint for detecting another part of the first call log not included in the first information.

3. The non-transitory computer-readable storage medium of claim 1, wherein the first watermarking content comprises two or more watermarks.

4. The non-transitory computer-readable storage medium of claim 1, wherein at least one of the two or more watermarks is secured based on different call log.

5. The non-transitory computer-readable storage medium of claim 1, wherein the first watermark content further comprises:
   information regarding a location, shape, and effect for displaying the first watermark on an original content.

6. The non-transitory computer-readable storage medium of claim 1, further comprising:
   in response that the second call log does not identify based on the received second information, displaying the original content which does not display the second watermark included in the second watermarking content or display an alert message at the designated location of the original content.

7. The non-transitory computer-readable storage medium of claim 1, wherein the first call log is a call time.

8. An electronic device comprising:
   a display;
   a communication interface connected to a specific electronic device through wireless communication; and
   a processor configured to:
      identify a first call log among call logs with a specific electronic device for transmitting a first watermarking content,
      create, based on the identified first call log, a first watermarking content comprising a first watermark to which a security is applied,
      create first information associating with the identified first call log for causing the specific electronic device to identify a call log corresponding to the identified first call log,
      control the communication interface to transmit the created first information and the created first watermarking content to the specific electronic device,
      receive a second information and a second watermarking content from another electronic device via the communication interface,
      identify, based on the received second information, a second call log corresponding to a call log used by the another electronic device when creating the second watermarking content,
      extract a second watermark from the received second watermark content using the identified second call log, and control the display to display the extracted second watermark on an original content.

9. The electronic device of claim 8, wherein the first information comprises a part of the first call log and a hint for detecting another part of the first call log not included in the first information.

10. The electronic device of claim 8, wherein the first watermarking content comprises two or more watermarks.

11. The electronic device of claim 8, wherein at least one of the two or more watermarks is secured based on different call log.

12. The electronic device of claim 8, wherein the first watermark contents further comprises information regarding a location, shape, and effect for displaying the first watermark on an original content.

13. The electronic device of claim 8, wherein the processor is further configured to:
    in response that the second call log does not identify based on the received second information, display the original content which does not display the second watermark included in the second watermarking content or display an alert message at the designated location of the original content.

14. The electronic device of claim 8, wherein the first call log is a call time.

15. A method of operating an electronic device, the method comprising:
    identifying a first call log among call logs with a specific electronic device for transmitting a first watermarking content;
    creating, based on the identified first call log, a first watermarking content comprising a first watermark to which a security is applied;
    creating first information associating with the identified first call log for causing the specific electronic device to identify a call log corresponding to the identified first call log;
    transmitting the created first information and the created first watermarking content to the specific electronic device;
    receiving a second information and a second watermarking content from another electronic device;
    identifying, based on the received second information, a second call log corresponding to a call log used by the another electronic device when creating the second watermarking content;
    extracting a second watermark from the received second watermark content using the identified second call log; and
    displaying the extracted second watermark on an original content.

16. The method of claim 15, wherein the first information comprises a part of the first call log and a hint for detecting another part of the first call log not included in the first information.

17. The method of claim 15,
    wherein the first watermarking content comprises two or more watermarks, and
    wherein at least one of the two or more watermarks is secured based on different call log.

18. The method of claim 15, wherein the first watermark content further comprises:
    information regarding a location, shape, and effect for displaying the first watermark on an original content.

19. The method of claim 15, further comprising:
    in response that the second call log does not identify based on the received second information, display the original content which does not display the second watermark included in the second watermarking content or display an alert message at the designated location of the original content.

20. The method of claim 15, wherein the first call log is a call time.

* * * * *